(12) United States Patent
Yeh

(10) Patent No.: US 6,448,514 B1
(45) Date of Patent: Sep. 10, 2002

(54) ELASTIC STRIP OF KEYBOARD AND METHOD FOR PRODUCING THE SAME

(75) Inventor: Chi-Pin Yeh, Tainan Hsien (TW)

(73) Assignee: Darfon Electronics Corp., Taoyuan (TW)

( * ) Notice: Subject to any disclaimer, the term of this patent is extended or adjusted under 35 U.S.C. 154(b) by 0 days.

(21) Appl. No.: 09/503,694

(22) Filed: Feb. 14, 2000

(30) Foreign Application Priority Data

Jul. 27, 1999 (TW) .......................................... 88112676

(51) Int. Cl.⁷ ................................................ H01H 9/26
(52) U.S. Cl. ....................................... 200/5 A; 200/517
(58) Field of Search ................................ 200/341–344, 200/512–517, 242, 253, 245, 15 A, 294, 333, 237–251, 282, 520–535; 400/491.1, 491.2, 491, 5 A, 495, 496, 495.1

(56) References Cited

U.S. PATENT DOCUMENTS

| | | | | |
|---|---|---|---|---|
| 4,456,800 A | * | 6/1984 | Holland | 200/5 A |
| 4,531,033 A | * | 7/1985 | Schmid et al. | 200/314 |
| 4,677,268 A | * | 6/1987 | Nemeth et al. | 200/159 |
| 4,775,574 A | * | 10/1988 | Fukushima et al. | 428/209 |
| 4,801,768 A | * | 1/1989 | Sugiyama et al. | 200/5 A |
| 5,107,083 A | * | 4/1992 | Yagi | 200/341 |
| 5,212,356 A | * | 5/1993 | English | 200/5 A |
| 5,613,599 A | * | 3/1997 | Inataki et al. | 200/512 |
| 5,674,018 A | * | 10/1997 | Kaufman et al. | 400/473 |
| 5,746,307 A | * | 5/1998 | Joss et al. | 200/303 |
| 5,760,351 A | * | 6/1998 | Tsai | 200/5 A |
| 5,777,281 A | * | 7/1998 | Riddiford | 200/5 A |
| 6,100,484 A | * | 8/2000 | Houze et al. | 200/512 |

* cited by examiner

Primary Examiner—P. Austin Bradley
Assistant Examiner—Lisa N. Klaus
(74) Attorney, Agent, or Firm—Ladas & Parry

(57) ABSTRACT

Elastic strips of a keyboard and a method for producing the same. An elastic sheer Is produced by using a mold, wherein the elastic sheet has a plurality of rows of elastic domes formed thereon. Then, the elastic sheet is cut into a plurality of elastic strips, each of which has only one row of elastic domes.

18 Claims, 9 Drawing Sheets

ELASTIC STRIP OF KEYBOARD AND METHOD FOR PRODUCING THE SAME

BACKGROUND OF THE INVENTION

1. Field of the Invention

The present invention relates in general to elastic strips of a keyboard and a method for producing the same.

2. Description of the Related Art

Referring to FIG. 1, a conventional keyboard of a notebook includes a plurality of key caps 11 (only one key cap is shown in the figure), a plurality of cap supports 12 (only one cap support is shown in the figure), an elastic sheet 13, a circuit membrane assembly 14 and a foundation sheet 15.

The foundation sheet 15 is a metal sheet on which a plurality of seats 151 and hooks 152 are formed by punching and pressing.

The circuit membrane assembly 14 includes three membrane layers, wherein a middle layer is sandwiched by two outer layers. On the outer layers are provided circuits, while on the middle layer are provided holes. By this arrangement, an electric conduction between the two circuits on the outer layers is induced when the outer layers are compressed to contact each other through the holes of the middle layer. Furthermore, a plurality of through holes 141 are provided on the circuit membrane assembly 14. That is, the through holes 141 penetrate the outer layers and the middle layer of the circuit membrane assembly 14.

The elastic sheet 13 is made of rubber and is formed by using the Injection Molding Method. The elastic sheet 13 has a sheet-like body 130, a plurality of elastic domes 131, connecting portions 133 and through holes 132, wherein the connecting portions 133 connect the elastic domes 131 and the sheet-like body 130. Further referring to FIG. 2, the elastic dome 131 has a plunger 1311 inside.

The cap support 12 has a first linking bracket 121 and a second linking bracket 122. The shaft portions 1221 of the second linking bracket 122 are inserted into the holes 1211 of the first linking bracket 121 so that the first linking bracket 121 and the second linking bracket 122 are hinged together. Such a structure is so called "scissors-type support structure". Furthermore, the first linking bracket 121 has shaft rods 1212, 1213 and the second linking bracket 122 has shaft rods 1222 on their corners.

Referring to FIG. 3, the key cap 11 has hook portions 111 and holding portions 112, 113 on its bottom surface.

Now, the way of assembling the conventional keyboard is described. The circuit membrane assembly 14 and the elastic sheet 13 are put on the foundation sheet 15, with the seats 151 and hooks 152 of the foundation sheet 15 sticking out through till the through holes 141 of the circuit membrane assembly 14 and the through holes 132 of the elastic sheet 13. The key cap 11 is mounted on the foundation sheet 15 via the cap support 12, wherein the shaft rods 1212 are inserted into the seats 151 so that the first linking bracket 121 is rotatable with respect to the foundation sheet 15, and the narrow portion 1223 of the second linking bracket 122 is hooked by the hook 152 of the foundation sheet 15 so that the second linking bracket 122 is also rotatable with respect to the foundation sheet 15. Furthermore, the shaft rods 1213 of the first linking bracket 121 are held by the hook portions 111, and the shaft rods 1222 of the second linking bracket 122 are held by the holding portions 112, 113.

In operation, the user pushes down the key cap 11 so as to compress the elastic dome 131. Then, the plunger 1311 of the elastic dome 131 pushes against the circuit membrane assembly 14 so that an electric conduction is induced to send out a corresponding signal.

In manufacture, however, the elastic sheet 13 of the conventional keyboard of a notebook has the following flaws: (1) The elastic sheet 13 is made of rubber and formed by the Injection Molding Method. Building the mold for the elastic sheet 13 is expensive. In addition, manufacturers need to build new molds for elastic sheets with new specifications because different kinds of keyboards are provided with different elastic sheets. Therefore, the cost for manufacturing keyboards is high. (2) A mold is built when a keyboard of a new specification is developed. However, if the elastic sheet 13 produced by using the mold has dimensions outside the tolerance, then the mold needs to be rebuilt. Then, the cost of developing the new keyboard is raised, the time for developing the new keyboard is elongated and the mass production of the new keyboards is delayed. It is disadvantageous for commercial competition. (3) The elastic sheet 13 has a plurality of rows of elastic domes 131 formed thereon. The distances between the rows of elastic domes 131 must comply with the distances between the key caps of the keyboard. Therefore, the materials connected between the rows of elastic domes 131 can not be eliminated. In other words, the weight of the elastic sheet 13 and the material cost cannot be reduced. (4) The user pushes down the key caps while typing. Referring to rig. 4, the stroke for the key cap 11 to contact the elastic sheet 13 is "L". For a conventional keyboard, however, the stroke generally is not long enough for the user to feel comfortable in operation. Referring to FIGS. 5A and 5B, a possible way to increase the stroke is to provide rectangular grooves 134 around the plunger 131. However, this arrangement reduces the thickness of the elastic sheet under the grooves to "H" so that the resistance of the mold cavity to the flow of the molten material is increased. Then, filling the mold cavity at the positions corresponding to the elastic domes tends to be incomplete.

SUMMARY OF THE INVENTION

An object of the present invention is to provide a means that solves the above-mentioned problems.

In the present invention, an elastic sheet is produced by using a mold, wherein the elastic sheet has a plurality of rows of elastic domes formed thereon. Then, the elastic sheet is cut into a plurality of elastic strips, each of which has only one row of elastic domes. Then, the elastic strips are disposed on keyboards.

To develop keyboards with new specifications, common portions of the new keyboard can use molds with prevailing specifications. Thus, only the molds for the elastic strips of new specifications need to be developed, and the cost for developing a new keyboard is therefore greatly reduced.

It is understood that only the molds for the new specifications need to be developed. If the development fails, the influences are local rather than overall. The engineers can fix the mistakes very soon so as to mass-produce the new keyboards in time. The present invention is advantageous for commercial competition.

In the present invention, the elastic sheets are cut into a plurality of elastic strips. Thus, the distances between the rows of the elastic domes on the elastic sheets do not need to comply with the distances between the key caps of the keyboards. The materials connected between the rows of elastic domes are reduced. And the material cost and the weight of the keyboard are reduced.

In the present invention, recesses are provided on the elastic strips and between the elastic domes to increase the stroke for the key caps to contact the elastic strips. While filling the mold cavity, the arrangement of the recesses does increase the resistance to the flow of molten material. However, the molten material can bypass the arrangement of the recesses so that the whole mold cavity is filled with molten material.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1:
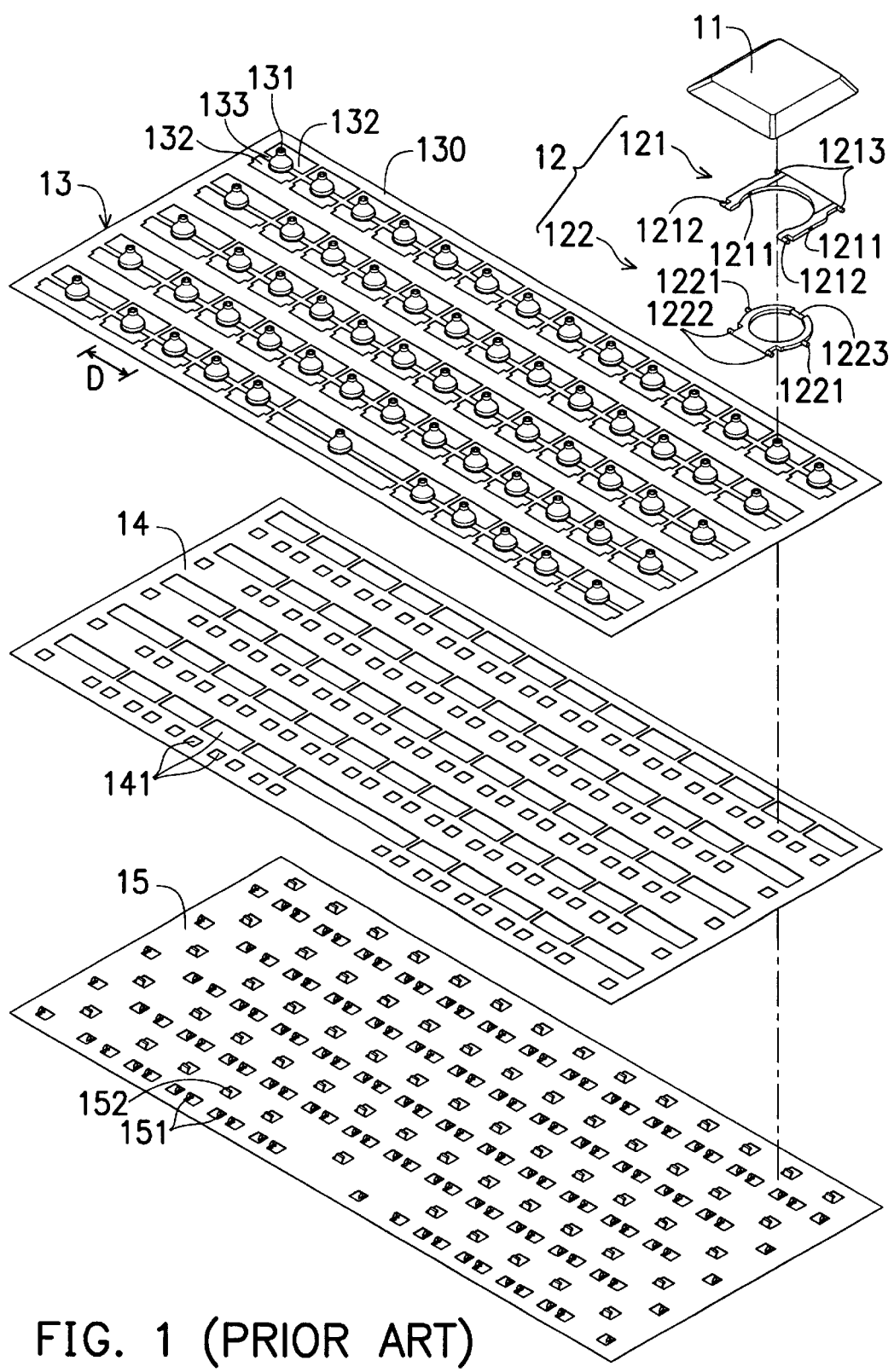
FIG. 1 is an exploded perspective diagram of a conventional keyboard of a notebook.
Figure 2:
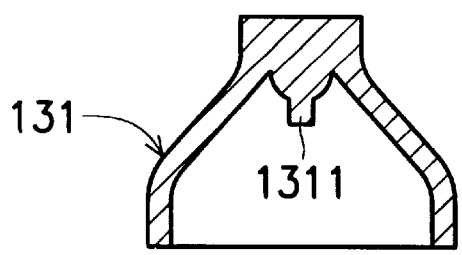
FIG. 2 is a sectional diagram of a plunger of the keyboard.
Figure 3:
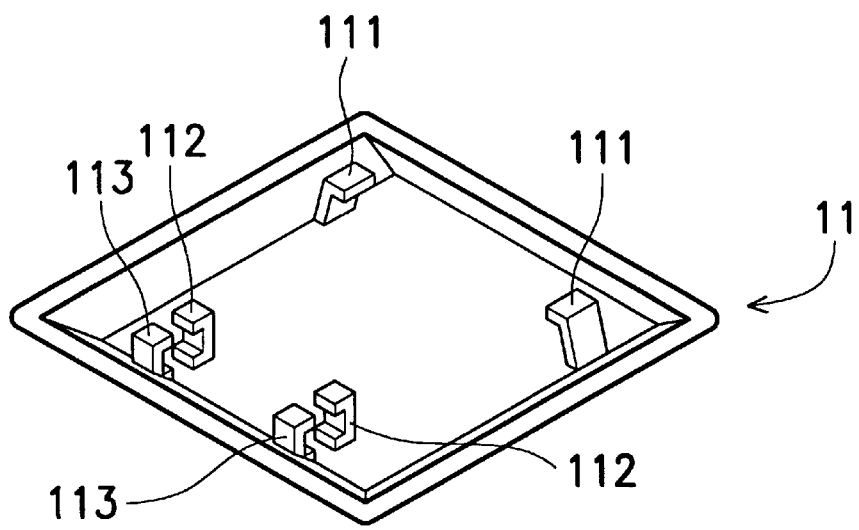
FIG. 3 is a bottom view of a key cap of the keyboard.
Figure 4:
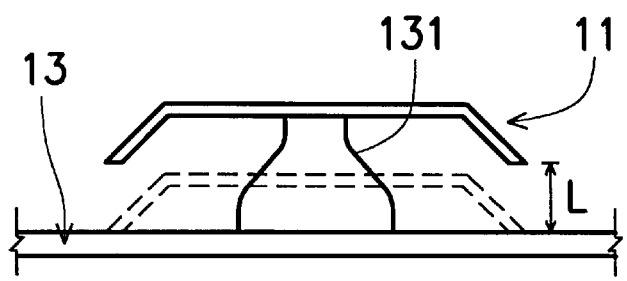
FIG. 4 shows a stroke "L" for the key cap to contact the elastic sheet.
Figure 5A:
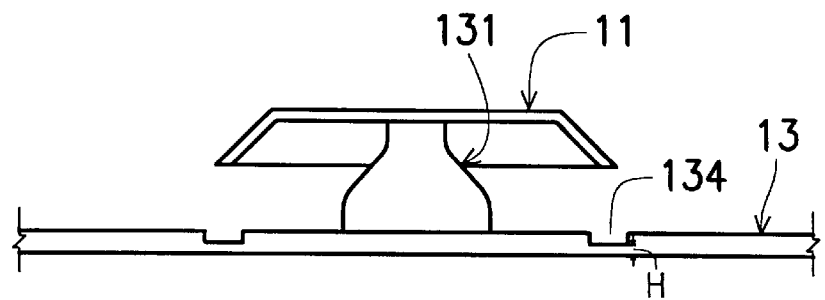
FIG. 5A depicts grooves provided on the elastic sheet to increase the stroke for the key cap.
Figure 5B:
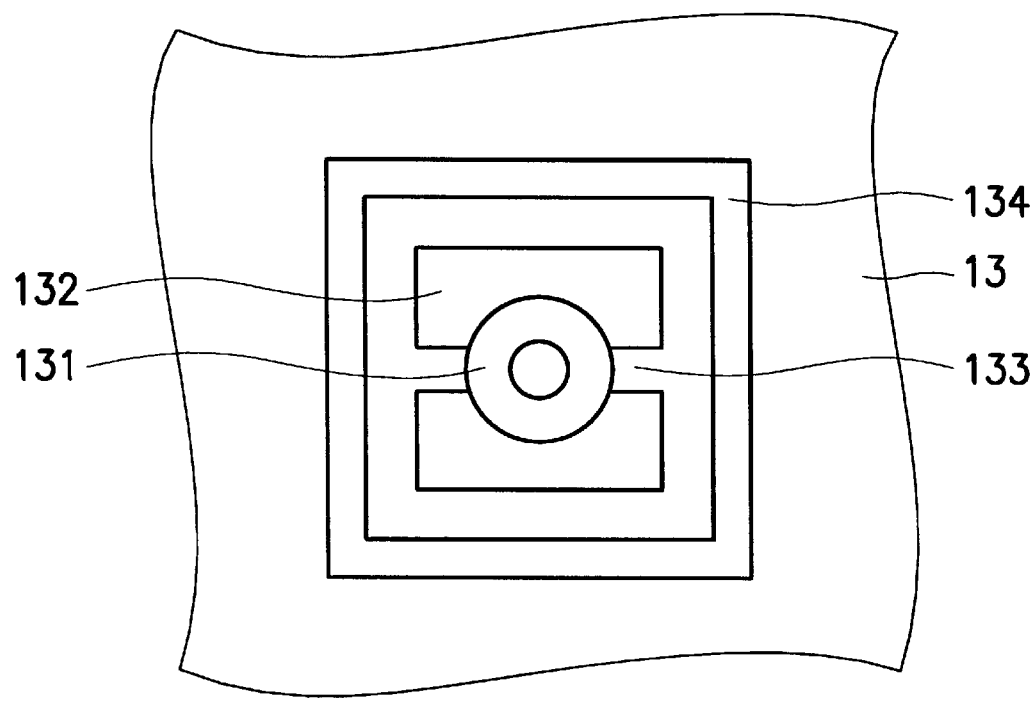
FIG. 5B is a top view of FIG. 5A.
Figure 6A:
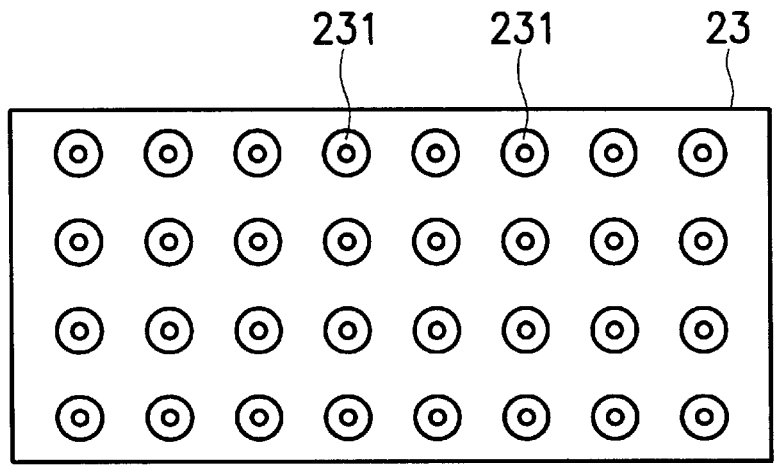
FIGS. 6A–6D depict the process of producing elastic strips of the present invention.
Figure 6B:
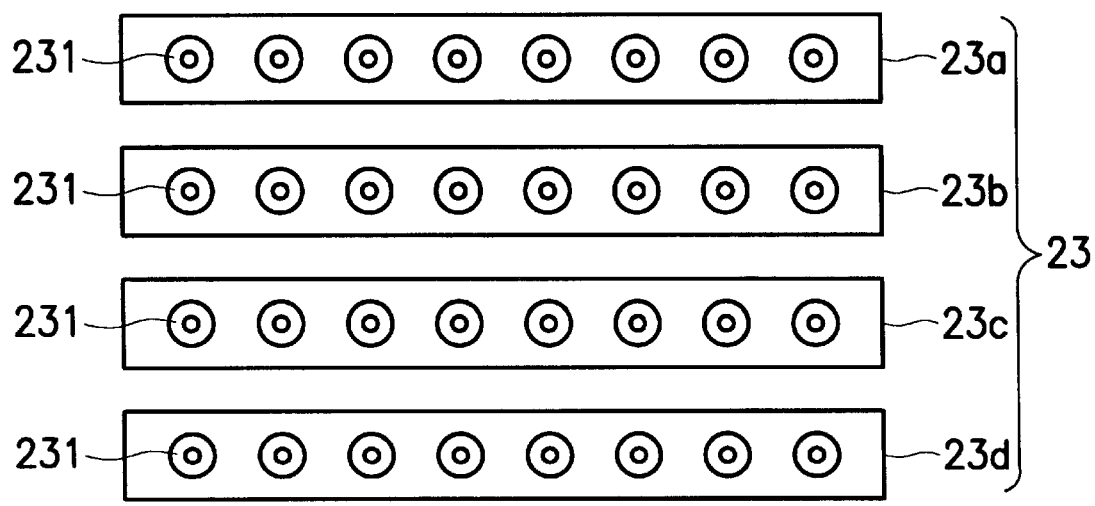
Figure 6C:
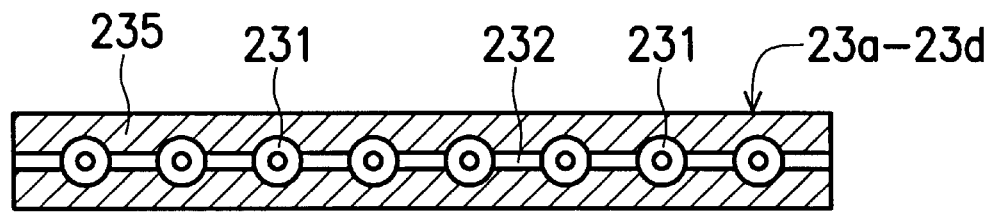
Figure 6D:
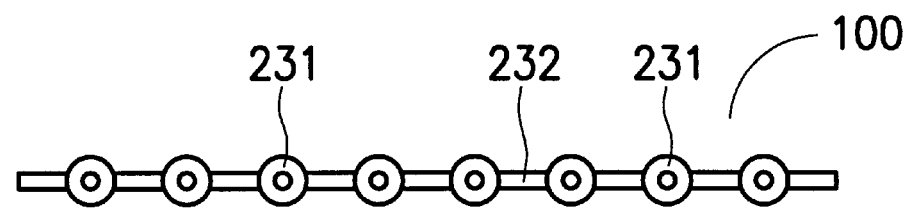

In the present invention, an elastic strip 100 shown in FIG. 6D rather than the elastic sheet of the prior art is used for a keyboard. It is noted that the elastic strip 100 has only one row of elastic domes 231. There are three different ways to produce the elastic strip 100 of the present invention: (1) As shown in FIG. 6A, an elastic sheet 23 having a plurality of rows of elastic domes 231 is formed by the Injection Molding method. Then, the elastic sheet 23 is cut into a plurality of pieces 23a, 23b, 23c, 23d . . . , as shown in FIG. 6B, wherein each piece has only one row of elastic domes 231. Then, as shown in FIGS. 6C and 6D, the pieces 23a, 23b, 23c, 23d are cut into the elastic strips 100 of the present invention, wherein the areas marked by the oblique lines are the removed portions. (2) The elastic sheet 23 shown in FIG. 6A is directly cut into the elastic strip of the present invention shown in FIG. 6D. (3) The pieces 23a, 23b, 23c, 23d shown in FIG. 6B are produced directly by the Injection Molding Method and then cut into the elastic strips 100 of the present invention shown in FIG. 6D.

Figure 7:
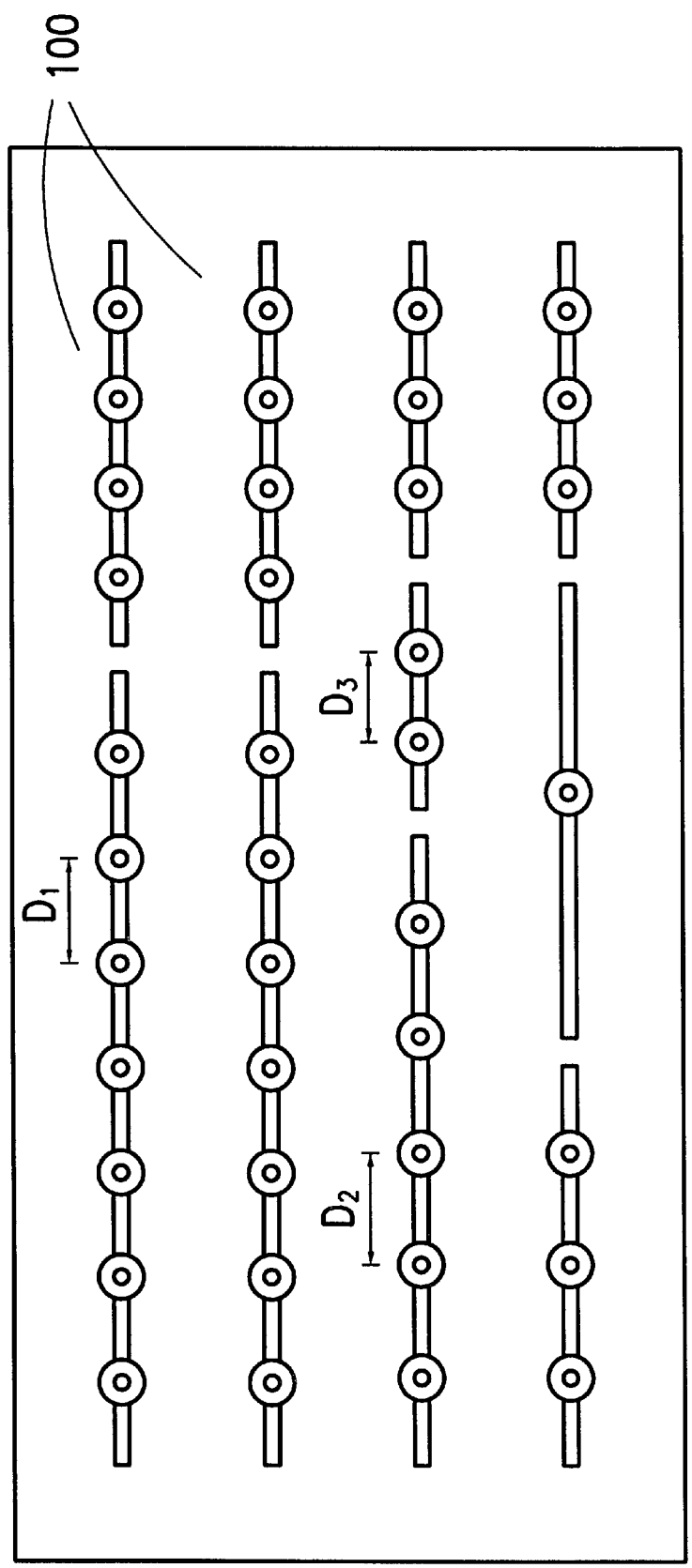
FIG. 7 shows the arrangement of the elastic strips of the present invention on a keyboard.

The elastic strips 100 of the present invention are disposed on the above-mentioned circuit membrane assemblies 14. It is noted that the dimensions of the key caps on a keyboard are not always the same. Thus, the elastic domes corresponding to the key caps are spaced different distances apart for different elastic strips 100, as shown in FIG. 7, in which $D_1 \neq D_2 \neq D_3 \neq$ . . . In other words, a plurality of elastic strips coming from different elastic sheets, in which the distances between the elastic domes are mutually different, are disposed on a keyboard.

Figure 8A:
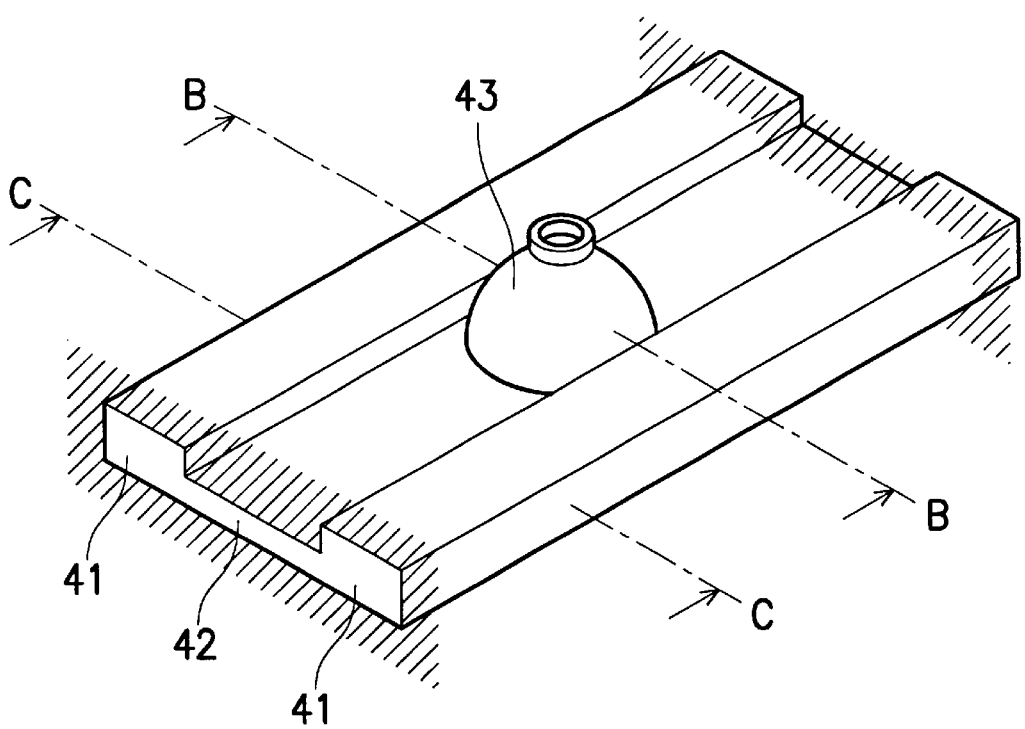
FIG. 8A depicts a mold for producing the elastic strips of the present invention.
Figure 8B:
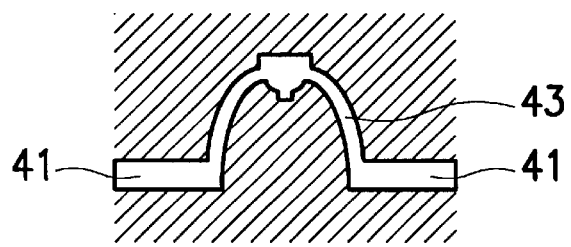
FIG. 8B is a sectional view of FIG. 8A along line B—B.
Figure 8C:
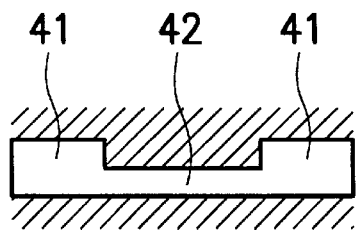
FIG. 8C is a sectional view of FIG. 8A along line C—C.
Figure 9A:
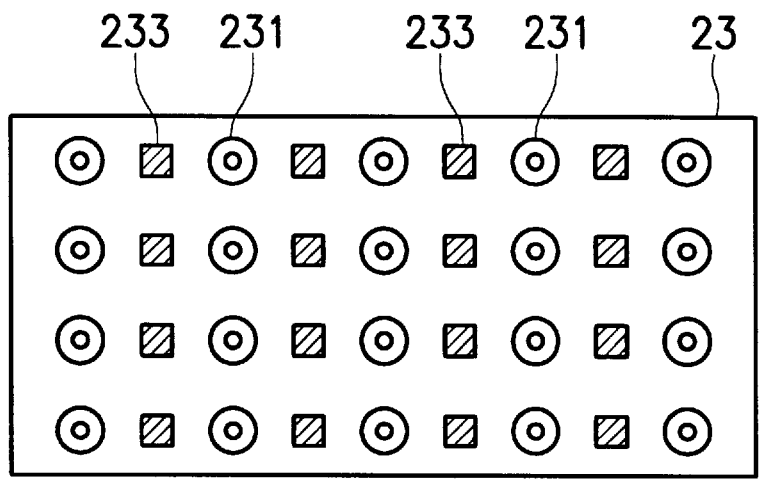
FIG. 9A shows an elastic sheet with recesses provided between elastic domes in accordance with an embodiment of the present invention.
Figure 9B:
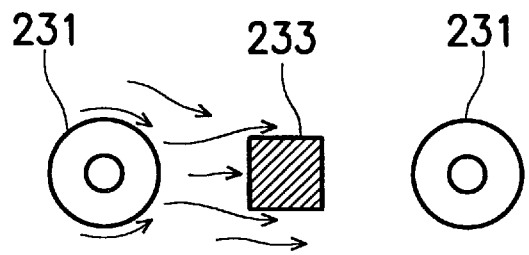
FIG. 9B is a local enlarged view of FIG. 9A, depicting the flow of molten material for filling the mold cavity.
Figure 9C:
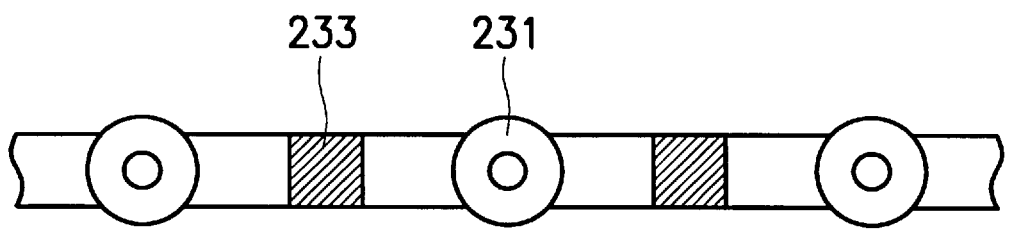
FIG. 9C depicts an elastic strip of an embodiment of the present invention obtained from cutting the elastic sheet shown in FIG. 9A.
Figure 9D:
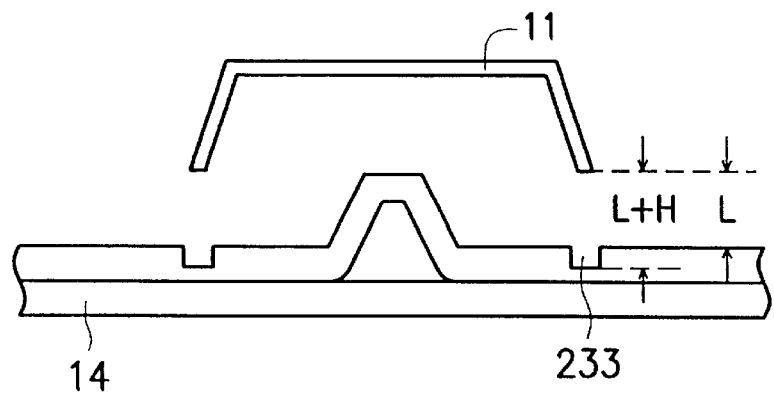
FIG. 9D depicts a section of a keyboard with the elastic strip shown in FIG. 9C disposed thereon.
Figure 9E:
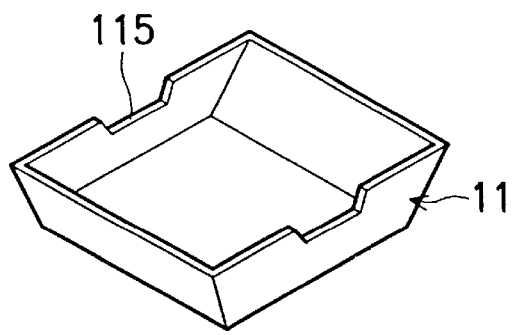
FIG. 9E depicts a key cap with notches provided on its edges in accordance with the present invention.

The present invention provides the following advantages: (1) For the keyboards with various specifications, common portions may use the elastic strips with prevailing specifications, while different portions may use the elastic strips with new specifications. Since only the molds for the elastic strips of new specifications need to be developed, the cost for developing a new keyboard is greatly reduced. (2) It is understood that only the molds for the elastic strips of new specifications need to be developed. If the development fails, the influences on the keyboards are local rather than overall. The engineers can fix the mistakes very soon so as to mass-produce the new keyboards in time. Therefore, the present invention is advantageous for commercial competition. (3) In the present invention, the elastic sheets are cut into a plurality of elastic strips. Then, the elastic strips are disposed on keyboards. Thus, the distances between the rows of the elastic domes on the elastic sheets do not need to comply with the distances between the key caps of the keyboards. The materials connected between the rows of elastic domes can be reduced. Also, the material cost and the weight of the keyboards are reduced. (4) Referring back to FIG. 6C, in the present invention, the thickness of the cut portions 235 remains unchanged while the thickness of the connecting portions 232 is reduced. The reason for reducing the thickness of the connecting portions 232 is to increase the stroke for the key cap to contact the elastic strip. The reason for maintaining the thickness of the cut portions is to facilitate the flowing of molten materials in the mold cavity. Now referring to FIGS. 8A–8C, the oblique lines mark the mold body of the present invention. Inside the mold body is the mold cavity which includes first spaces 41, second spaces 42 and third spaces 43 communicating with one another. The cut portions 235, connecting portions 232 and elastic domes 231 of the elastic sheet 23 of the present invention are formed in the first spaces 41, second spaces 42 and third spaces 43, respectively. It is understood that the second spaces 42, in which the thin connecting portions are formed, are smaller than the first spaces 41 in which the thick cut portions are formed. The resistance to the flow of molten material in the small second spaces is great. Nevertheless, most molten material flows to the third spaces via the large first spaces 41 so that the filling of the third spaces is complete. Alternatively, recesses 233 are provided between the elastic domes 231 as shown in FIG. 9A. The recesses 233 are used for receiving the edges of the key caps so as to increase the stroke for the key caps. While filling the mold cavity, the arrangement of the recesses 233 does increase the resistance to the flow of molten material. However, the molten material can bypass the arrangement of the recesses 233 as shown in FIG. 9B, so that the whole mold cavity is filled with molten material. FIG. 9C depicts an elastic strip of another embodiment obtained from cutting the elastic sheet shown in FIG. 9A. FIG. 9D depicts a section of a keyboard with the elastic strip disposed thereon, wherein the recesses 233 are positioned under the edges of the key cap. Thus, the stroke for the key cap to contact the circuit membrane assembly is increased from "L" to "L+H". Furthermore, as shown in FIG. 9E, notches 115 are provided on the edges of the key cap for receiving the connecting portions of the elastic strip when the key cap is pushed down. By this arrangement, the stroke for the key cap is further increased.

Figure 9F:
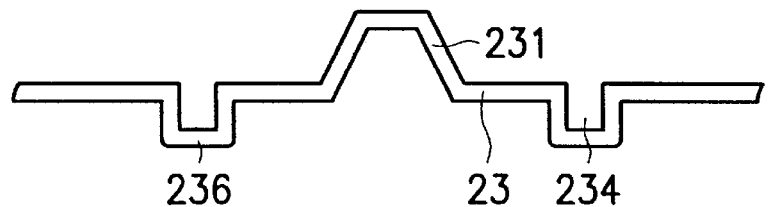
FIG. 9F depicts an elastic strip with recesses provided between elastic domes in accordance with another embodiment of the present invention.
Figure 9G:
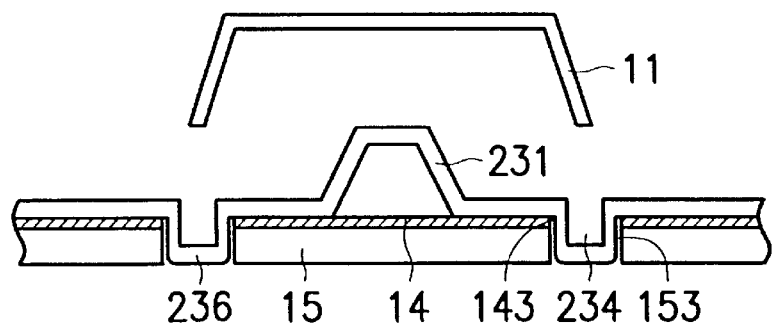
FIG. 9G depicts the arrangement of the elastic strip shown in FIG. 9F on the keyboard.

The above-mentioned recesses can be further modified to increase the stroke for the key cap. As shown in FIG. 9F, the elastic strip is provided with downward protrusions 236 to deepen the recesses 234. Further referring to FIG. 9G, through holes 143, 153 are provided on the circuit membrane assembly 14 and the foundation sheet 15 for receiving the protrusions 236. This arrangement increases the stroke for the key cap. Besides, disposing the elastic strip on the keyboard via this arrangement is easy, fast and without deviations.

An important aspect of the present invention is changing the conventional elastic sheet into the elastic strips. Each elastic strip has only one row of elastic domes.

Furthermore, it is understood that the elastic strips of the present invention are suitable for various keyboards, besides the keyboard provided with the "scissors-type support structure" mentioned above.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A keyboard, comprising:
   a foundation sheet;
   a circuit membrane assembly disposed on the foundation sheet;
   a plurality of elastic strips disposed on the circuit membrane assembly, each of the elastic strips having one row of elastic domes;
   a plurality of cap supports;
   a plurality of key caps movably mounted on the foundation sheet via the cap supports for pushing the elastic domes so that the elastic domes push against the circuit membrane assembly; and
   a connecting portion integrally formed between two adjacent domes of the elastic domes of each elastic strip, the connecting portion being only connected with the two adjacent domes, a width of the connecting portions being substantially smaller than a diameter of the elastic domes.

2. A keyboard as claimed in claim 1, wherein the elastic strips further have connecting portions connecting the elastic domes; and on the connecting portions are formed recesses corresponding to edges of the key caps.

3. A keyboard as claimed in claim 1, wherein the elastic strips further have connecting portions connecting the elastic domes; and notches are provided on edges of the key caps corresponding to the connecting portions.

4. A keyboard as claimed in claim 1, wherein the elastic strips further have connecting portions connecting the elastic domes; recesses are formed on the connecting portions corresponding to edges of the key caps; and notches are provided on the edges of the key caps corresponding to the recesses.

5. A keyboard as claimed in claim 1, wherein the elastic strips further have protrusions facing the circuit membrane assembly, and first through holes are formed on the circuit membrane assembly to receive the protrusions.

6. A keyboard as claimed in claim 5, wherein second through holes are formed on the foundation sheet to receive the protrusions.

7. A keyboard, comprising:
   a foundation sheet;
   a circuit membrane assembly disposed on the foundation sheet;
   a plurality of discrete elastic strips disposed on the circuit membrane assembly, each of the elastic strips having one row of elastic domes;
   a plurality of cap supports;
   a plurality of key caps movably mounted on the foundation sheet via the cap supports for pushing the elastic domes so that the elastic domes push against the circuit membrane assembly; and
   a connecting portion integrally formed between two adjacent domes of the elastic domes of each discrete elastic strip, the connecting portion beings only connected with the two adjacent domes, a width of the connecting portions being substantially smaller than a diameter of the elastic domes.

8. A keyboard as claimed in claim 1, wherein the elastic strips further have connecting portions connecting the elastic domes; and on the connecting portions recesses are formed corresponding to edges of the key caps.

9. A keyboard as claimed in claim 1, wherein the elastic strips further have connecting portions connecting the elastic domes; and notches are provided on edges of the key caps corresponding to the connecting portions.

10. A keyboard as claimed in claim 1, wherein the elastic strips further have connecting portions connecting the elastic domes; recesses are formed on the connecting portions corresponding to edges of the key caps; and notches are provided on the edges of the key caps corresponding to the recesses.

11. A keyboard as claimed in claim 1, wherein the elastic strips further have protrusions facing the circuit membrane assembly, and a first set of through holes are formed on the circuit membrane assembly to receive the protrusions.

12. A keyboard as claimed in claim 5, wherein a second set of through holes are formed on the foundation sheet to receive the protrusions.

13. A keyboard, comprising:
   a circuit membrane assembly;
   a plurality of elastic strips, separately made and separately removable, disposed on the circuit membrane assembly, each of the elastic strips having one row of elastic domes;
   a plurality of key caps and cap supports; and
   a connecting portion integrally formed between two adjacent domes of the elastic domes of each elastic strip, the connecting portion being only connected with the two adjacent domes, a width of the connecting portions being substantially smaller than a diameter of the elastic domes.

14. A keyboard as claimed in claim 13, wherein the elastic strips have connecting portions connecting the elastic domes.

15. A keyboard as claimed in claim 14, wherein on the connecting portions recesses are formed corresponding to edges of the key caps.

16. A keyboard as claimed in claim 14, wherein notches are provided on edges of the key caps corresponding to the connecting portions.

17. A keyboard as claimed in claim 13, wherein the elastic strips have protrusions facing the circuit membrane assembly, and a first set of through holes are formed on the circuit membrane assembly to receive the protrusions.

18. A keyboard as claimed in claim 17, wherein a second set of through holes are formed on the foundation sheet to receive the protrusions.

\* \* \* \* \*